United States Patent [19]

Seifert

[11] Patent Number: 5,791,058

[45] Date of Patent: Aug. 11, 1998

[54] INFRASTRUCTURE INSPECTION METHOD

[76] Inventor: William F. Seifert, 9051 Sorenson Ave., Santa Fe Springs, Calif. 90670

[21] Appl. No.: 699,927

[22] Filed: Aug. 20, 1996

[51] Int. Cl.⁶ .................................................. G01L 1/00
[52] U.S. Cl. .......................... 33/1 HH; 33/1 H; 33/263; 33/333; 52/105
[58] Field of Search .................................. 33/1 H, 1 HH, 33/263, 286, 333, 645; 116/200, 201, 212, 281, 283, 203; 52/105; 73/786, 784, 768

[56] References Cited

U.S. PATENT DOCUMENTS

| | | | |
|---|---|---|---|
| 1,781,517 | 11/1930 | McKeown | 52/57.31 |
| 4,148,164 | 4/1979 | Humphrey | 52/105 |
| 4,150,490 | 4/1979 | Sluka | 33/1 H |
| 4,472,883 | 9/1984 | Ortega | 33/1 H |
| 4,694,304 | 9/1987 | Engdahl | 346/7 |
| 5,509,374 | 4/1996 | Trout | 33/1 H |
| 5,680,738 | 10/1997 | Allen et al. | 52/729.1 |

FOREIGN PATENT DOCUMENTS 142071  3/1961  U.S.S.R. .................................. 33/1 H

*Primary Examiner*—Diego F. F. Gutierrez
*Assistant Examiner*—Andrew Hirshfeld
*Attorney, Agent, or Firm*—Edgar W. Averill, Jr.

[57] ABSTRACT

A method of determining whether a structure such as a bridge has been severely damaged by an earthquake or other disturbance such as a flood. The method is designed to be carried out by unsophisticated persons immediately after such disturbance so that unnecessary delays will not be caused by the closing of bridges and the like which are not severely damaged. The method involves affixing a target to one portion of the structural member such as a span and affixing a pointer on another structural member such as a column. Preferably the target and pointer are positioned in such a way that a safe or unsafe determination can be easily made by the viewer.

7 Claims, 5 Drawing Sheets

5,791,058

1

INFRASTRUCTURE INSPECTION METHOD

BACKGROUND OF THE INVENTION

The field of the invention is structural engineering and the invention relates more particularly to the determination of the safety of structural elements such as bridges after an earthquake, flood or other disaster. During a seismic event not only the earth moves but all structures on the earth in the area of the seismic event also move. Immediately after such an event it is important to check the relative movements of various bridge parts such as freeway overpasses and railroad bridges. Spans sitting on abutments or piers or columns can be displaced from their original location by the seismic event. The amount of displacement can be critical to the structure's integrity. In order to quickly ascertain the movement by any observer a method of detection and measurement would be very valuable. At the present time, a skilled engineer must actually observe the bridge to determine whether it has been sufficiently damaged to require closing.

Numerous relative movement devices have been proposed. One such device is U.S. Pat. No. 1,781,517 where an expansion bearing is provided in a bridge. One part of the expansion bearing supports a target and the other part of the expansion bearing supports a pointer and the lateral movement of one versus the other can be read by observing the pointer against the target. Another structural movement measuring device is shown in U.S. Pat. No. 4,472,883 where two ends of the device are affixed over a crack in a wall surface after any movement between the wall on one side of a crack as compared to the wall on the other side of a crack and can be read and a length measuring portion as well as an angle measuring portion is provided. U.S. Pat. No. 4,694,304 utilizes two A-frame members, one attached to a ceiling and the other attached to a floor. The horizontal movement of the floor and ceiling can be ascertained after any such movement.

While such devices and methods are useful for limited purposes, they are not applicable to the determination of safe or unsafe status of a bridge or other structural member.

BRIEF SUMMARY OF THE INVENTION

It is an object of the present invention to provide a method for easily determining whether a bridge or other structural member is safe or unsafe by a simple observation of an untrained person.

The present invention is for a method of ascertaining damage to a structure as the result of an earthquake or other disturbance. The structure is of the type that is supported on the ground by at least a column or other vertically extending member and has at least one span supported by at least a portion of the column. The method comprises the steps of affixing a target on one of the structural members, namely the span on the column and affixing a pointing means on the other of the structural members such as the column or the span. The target and pointing means are oriented with respect to each other so that the movement of one with respect to the other may be easily observed from a remote location. Then after a disturbance a pointing means is viewed against the target and a determination can easily be made as to the safety of the structure. Preferably the target is smaller than the pointing means so that the target is not visible unless the pointing means has moved so much that an unsafe condition is possible. The movement of the column can be exaggerated by placing the pointing means at the end of an elongated arm affixed to the column.

2

Figure 1:
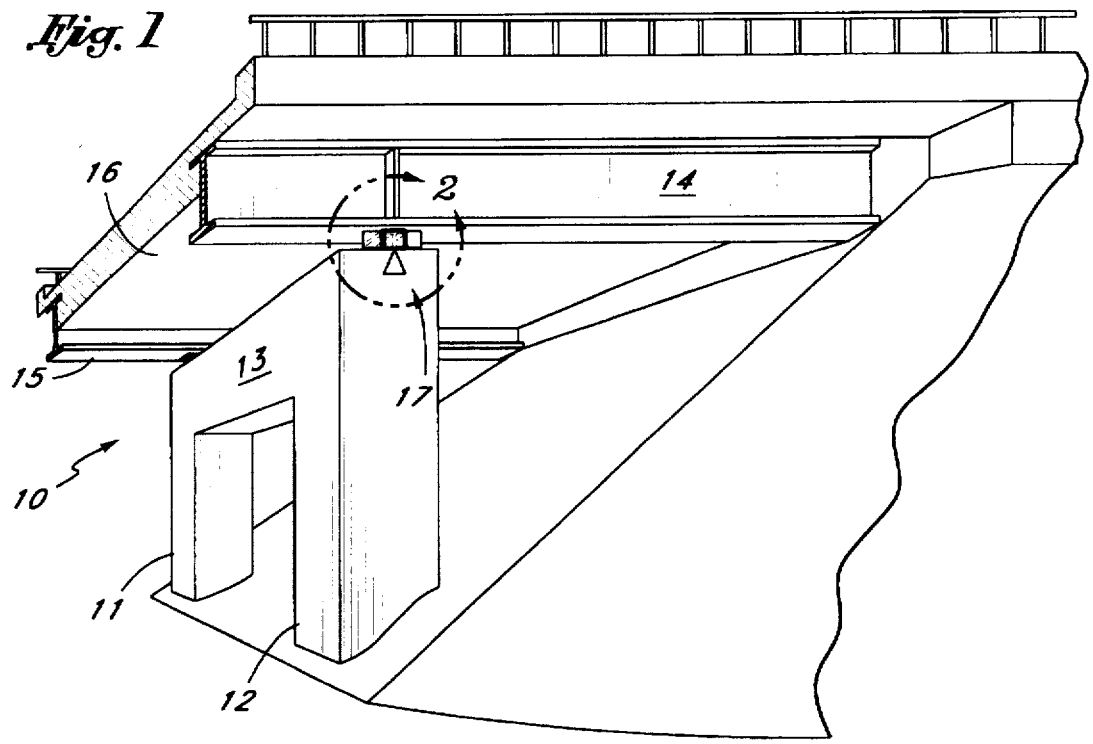
FIG. 1 is a perspective view of an overpass including a span held over a column.
Figure 2:
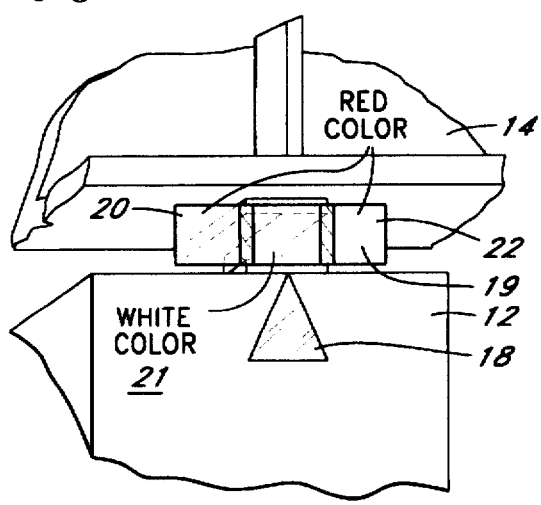

FIG. 2 is an enlarged view taken along 2—2 of FIG. 1 with the bridge in an undamaged condition.

Figure 3:
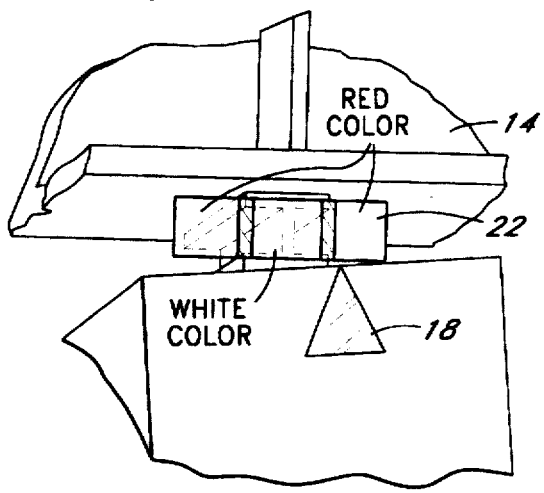

FIG. 3 is a view analogous to FIG. 2 but showing the bridge in an unsafe condition.

Figure 4:
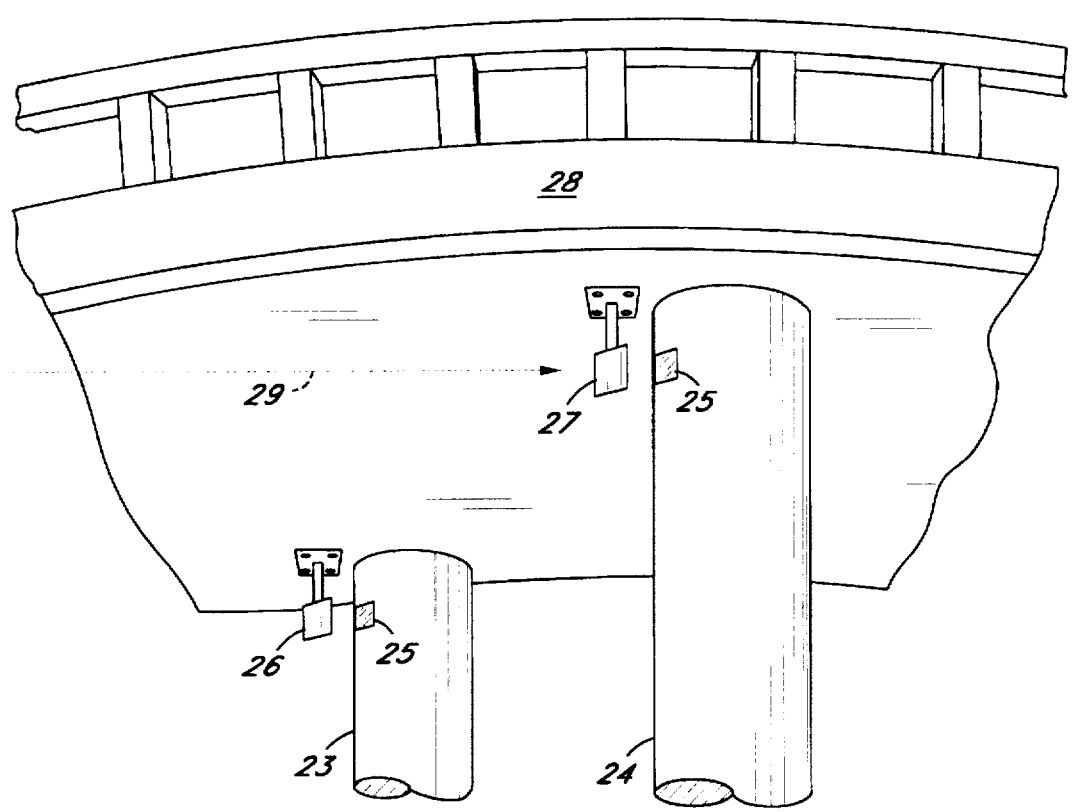

FIG. 4 is a perspective view of an overpass supported on a pair of columns and including a pair of targets affixed to the columns and a pair of pointing means affixed to the overpass span.

Figure 5:
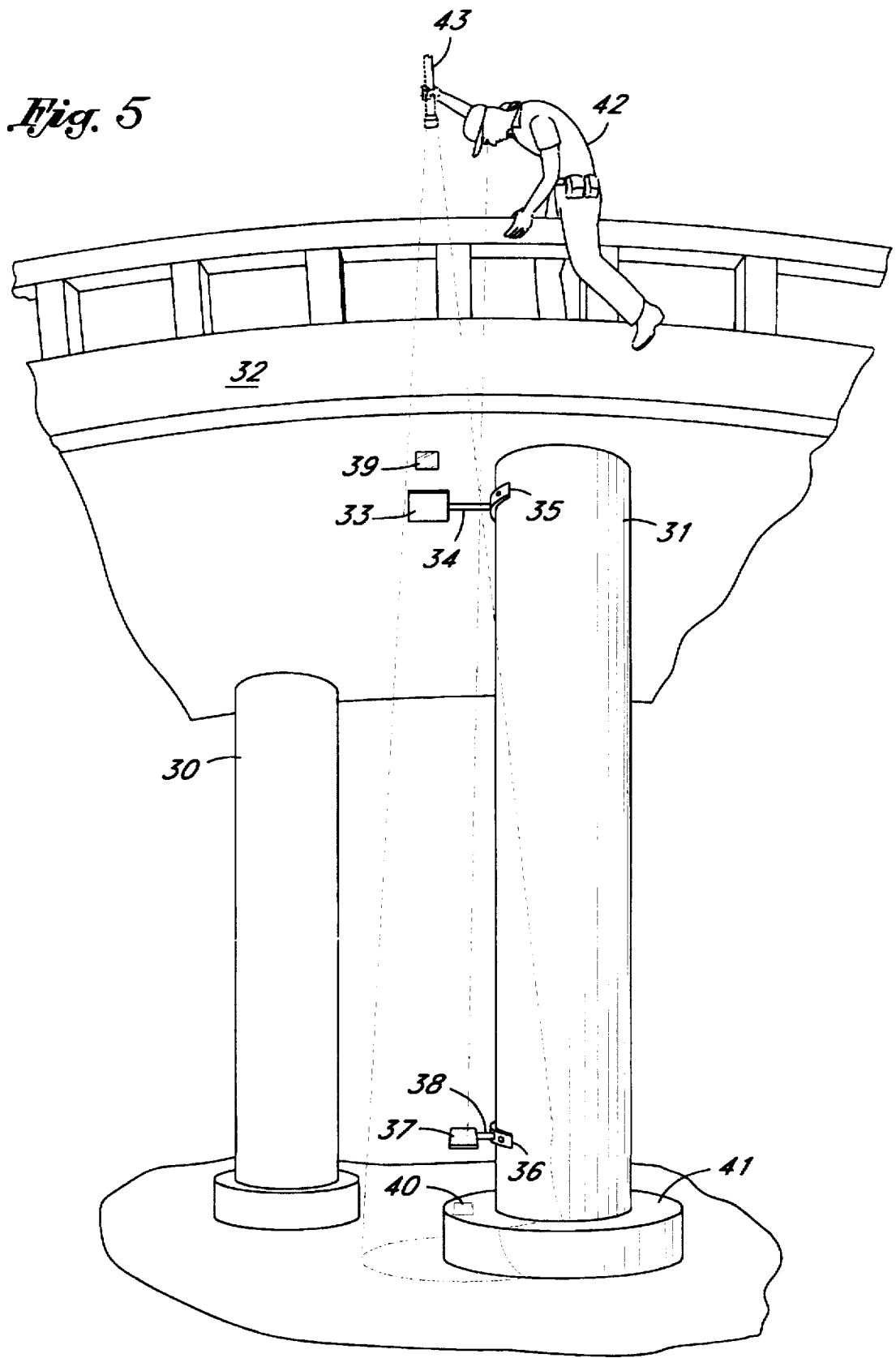

FIG. 5 is a perspective view of an overpass showing a pointing means affixed to a column near the base thereof and a target affixed to a support structure.

Figure 6:
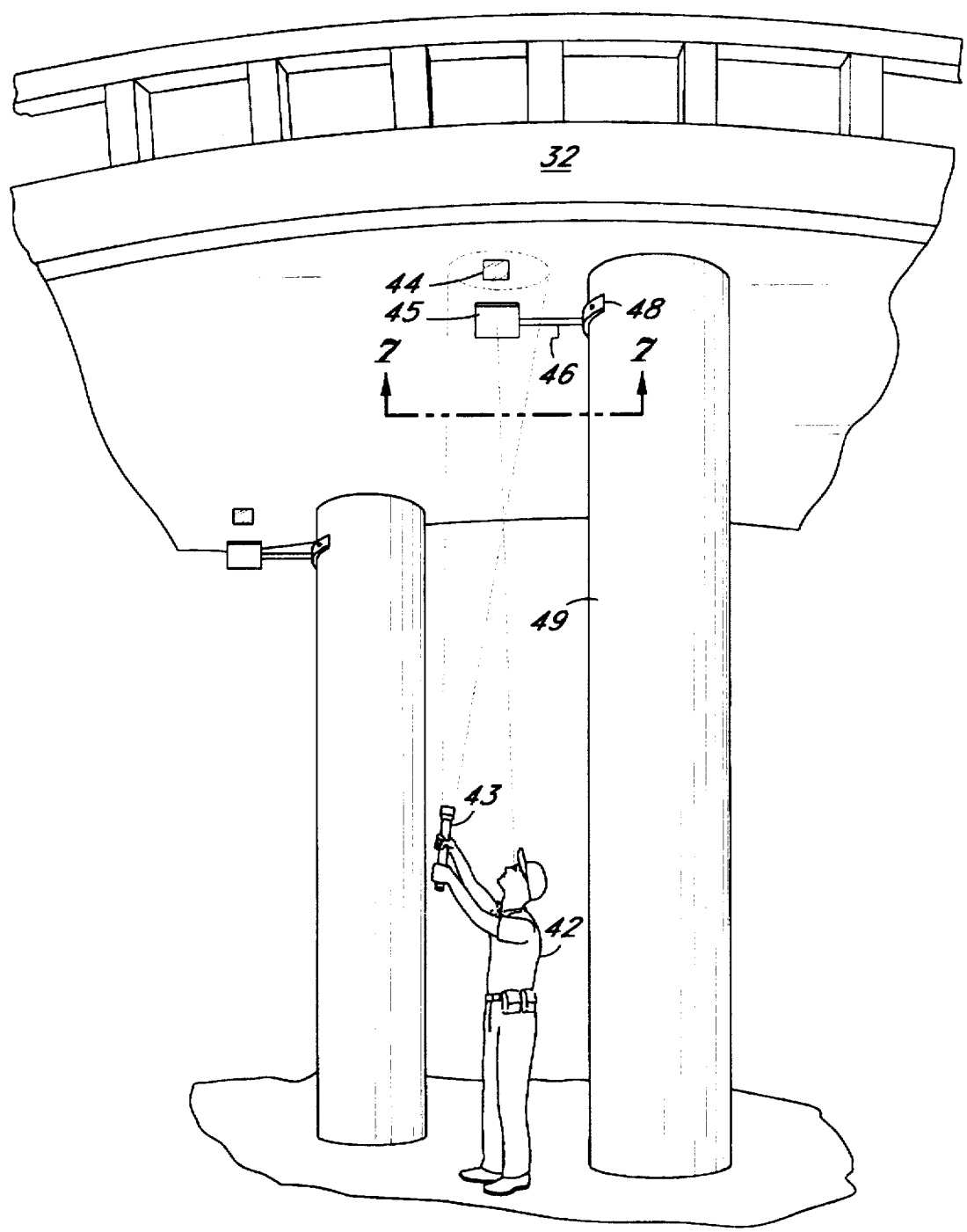

FIG. 6 is a perspective view showing a bridge span supported on two columns with a pointing means affixed near the top of each column and a target affixed to the underside of the span.

Figure 7:
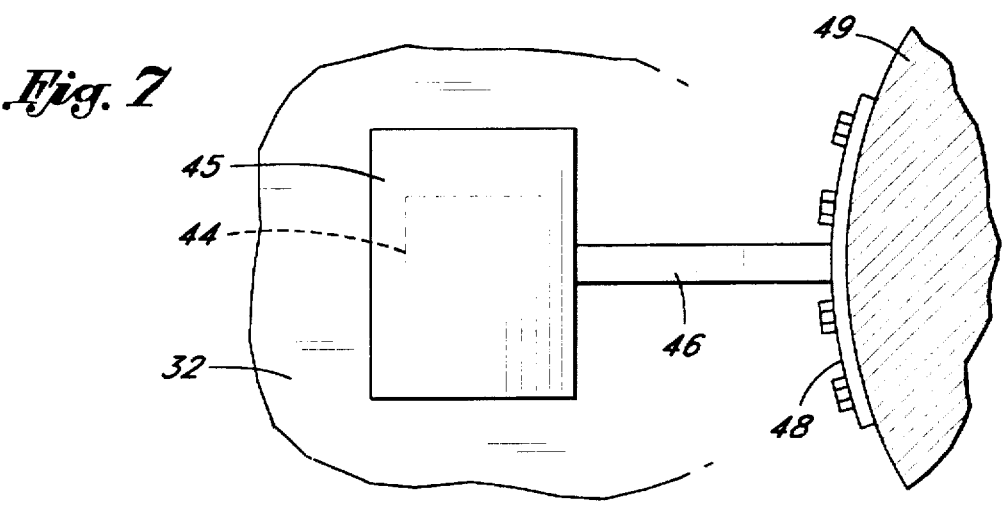

FIG. 7 is an enlarged view taken along line 7—7 of FIG. 6 with the bridge in a safe condition.

Figure 8:
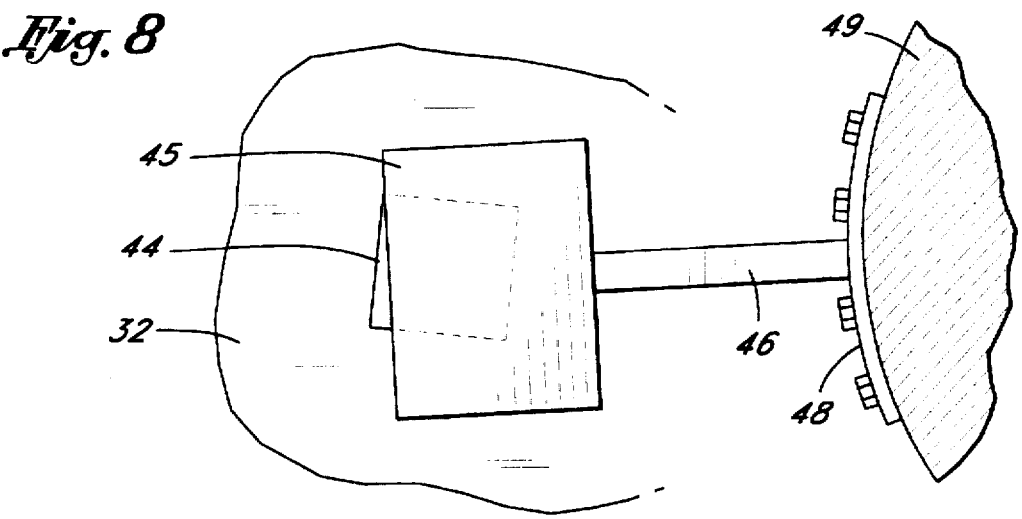

FIG. 8 is a view analogous to FIG. 7 but showing the bridge in an unsafe condition.

Figure 9:
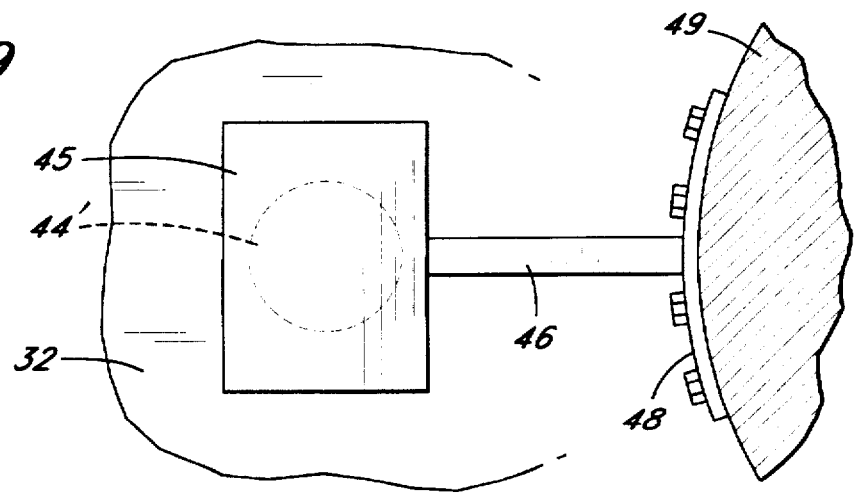

FIG. 9 is a view analogous to FIG. 7 but showing a round target in place of the rectangular target of FIG. 7.

DESCRIPTION OF THE PREFERRED EMBODIMENTS

A portion of a bridge is shown in perspective view in FIG. 1 indicated by reference character 10. Bridge portion 10 is supported by a pair of columns 11 and 12 which are held together by a cross-member 13. A pair of I-beam spans 14 and 15 support a roadway 16.

A target and pointing means 17 is indicated in FIG. 1 and shown in enlarged view in FIG. 2. Column 12 holds a pointing means 18 comprising an isosceles triangle with its point uppermost. A target 19 is supported to move with span 14 and has three different portions, namely a red square 20, a white square 21 and a second red square 22. When pointing means 18 points to the white collar as shown in FIG. 2 the span is considered safe for use of the roadway. However, when the span has moved as shown in FIG. 3 and the pointing means 18 points to red square 22, the bridge is unsafe and should not be used. The size and positioning of the target and pointer should be designed by structural engineers so that the amount of movement is significant to show a change from safe to not safe. However, once the target and pointing means have been installed, an unskilled person can determine whether or not the pointing means points to a white area or a red area, and thus, make a determination as to safe or unsafe. The result is a very quick determination which may be carried out by many persons in a short period of time since the persons do not have to be particularly skilled to carry out this reading.

Various other target and pointing means may also be used. For instance in FIG. 4 columns 23 and 24 have targets 25 affixed thereto. Pointing means 26 and 27 are affixed to the underside of span 28. The system is designed to be observed from a particular viewing angle indicated by arrow 29 and if the target 25 is not visible behind pointing means 27 it is considered that the bridge is safe. In FIG. 5 columns 30 and 31 support a span 32. Column 31 has a pair of pointing means comprising a rectangular plate 33 affixed by an arm 34 to a bracket 35 held to column 31. Similarly, the lower bracket 36 holds a rectangular pointing means 37 at the end of an arm 38. An upper target 39 is affixed to the underside of span 32 and a lower target 40 is affixed to foundation 41. A workman 42 holding a flashlight 43 may determine the relative movement between column 31 and foundation 41 by simply viewing the pointing means 37 and determining whether or not the lower target 40 is visible. As shown in FIG. 5, the target 40 would be hidden by the pointing means 37 if no significant movement has been made, but would be visible as shown in FIG. 8 if significant and dangerous movement has occurred. Similarly, as shown in FIG. 6 the workman 42 can observe the visibility of target 44 behind rectangular pointing means 45 by shining a flashlight 43 thereon and observing whether or not the target 44 affixed to span 32 is visible behind pointing means 45 affixed to arm 46 to bracket 48 which is in turn held by column 49.

Turning to FIG. 7, pointing means 45 completely obscures target 44 when there has been no relative movement between column 49 and span 32. In FIG. 8, however, the column and span have moved with respect to one another and the target 44 is visible behind the pointing means 45. Whereas a square target has been shown in FIG. 8, the target, of course, can be round as shown by target 44' in FIG. 9 as can the pointing means. It is also important to note the multiplying effect of arm 46 which, of course, would amplify any twisting between the column and span.

Numerous modifications of the relative designs of the pointing means and target are possible dependent upon the type of movement which can cause severe weakness of the structure. Thus, both the pointing means and the span could be rectangular and allowed to move a relatively large distance along the length of the rectangle but a relatively short distance along the width of the rectangle before the target becomes visible behind the pointing means. In this way, the engineer can design the target and pointing means to enable an untrained observer to determine damage.

Thus, shortly after an earthquake, flood or other event, the safety of structures can be quickly ascertained. Damaged structures can be quickly closed and undamaged structures can be open for use. Where the relative movement is questionable, then the structure should be closed until it can be observed by trained structural engineers. The apparatus required for installing such a system is inexpensive and could readily be added to all bridges in earthquake prone areas. Furthermore, the determination of damage can be made by volunteers or persons of limited training to further reduce the cost of operating such a system. The term "structure" as used herein is intended to include buildings as well as bridges. The essential feature being the support of a generally horizontal member or span by at lease one column.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A method of ascertaining damage to a structure as a result of an earthquake, said structure being of the type which is supported on the ground by at least one column and has at least one span adjacent a portion of said column, said column and said span being structural members, said method comprising the steps of:

affixing a target on one of said structural members at a time when the structure is undamaged said target including a safe indicating zone and an unsafe indicating zone;

affixing pointing means on the other of said structural members, so that said pointing means points to the safe indicating zone said target and said pointing means being oriented with respect to each other so that the movement of one with respect to the other may be observed from a remote location;

awaiting an earthquake; and viewing the pointing means relative to the target and noting the amount of relative movement therebetween, wherein movement of the pointing means to the unsafe indicating zone indicates movement of the structural members beyond a structurally safe distance.

2. The method of ascertaining damage to a structure of claim 1 wherein said target is affixed to said span and said pointing means is affixed to said column.

3. A method of ascertaining damage to a structure as the result of an earthquake, said structure being of the type which is supported on the ground by at least one column and has at least one span adjacent a portion of said column, said column and said span being structural members, said method comprising the steps of:

affixing a target on one of said structural members at a time when the structure is undamaged;

affixing pointing means on the other of said structural members, said target and said pointing means being oriented with respect to each other so that the movement of one with respect to the other may be observed from a remote location;

awaiting an earthquake; and viewing the pointing means relative to the target and noting the amount of relative movement therebetween and wherein the target is smaller than the pointing means and the target is positioned so that it is only visible if the pointing means has moved past an acceptable distance.

4. The method of ascertaining damage to a structure of claim 3 wherein said target has an outer rectangular silhouette and said pointing means also has a rectangular outer silhouette so that the relative movement of the pointer and the target in any direction may be observed.

5. The method of ascertaining damage to a structure of claim 4 wherein said target is square.

6. The method of ascertaining damage to a structure of claim 3 wherein the target is coated with a reflective coating to facilitate the observance of the position of the pointing means against the target.

7. The method of ascertaining damage to a structure of claim 3 wherein said pointing means is affixed to said column at the end of an elongated arm to magnify the relative movement of the target and the pointing means.

* * * * *